US012414901B1

(12) United States Patent
Shahbazi et al.

(10) Patent No.: US 12,414,901 B1
(45) Date of Patent: Sep. 16, 2025

(54) APPARATUS, SYSTEM, AND METHOD FOR AUTOMATED MEDICATION DISPENSING DEVICES

(71) Applicant: RXMATICS LLC, Sugarland, TX (US)

(72) Inventors: Ben Shahbazi, Houston, TX (US); Ahmad Ahmadi, Sugar Land, TX (US)

(73) Assignee: RXMATICS LLC, Sugar Land, TX (US)

(*) Notice: Subject to any disclaimer, the term of this patent is extended or adjusted under 35 U.S.C. 154(b) by 0 days.

(21) Appl. No.: 18/814,155

(22) Filed: Aug. 23, 2024

(51) Int. Cl.
*A61J 7/00* (2006.01)
*A61G 12/00* (2006.01)
*A61J 1/03* (2023.01)

(52) U.S. Cl.
CPC .......... *A61J 7/0076* (2013.01); *A61G 12/001* (2013.01); *A61G 2203/20* (2013.01); *A61J 1/03* (2013.01)

(58) Field of Classification Search
CPC ......... A61J 7/0076; A61J 1/03; A61G 12/001; A61G 2203/20
USPC .............................................................. 221/1
See application file for complete search history.

(56) References Cited

U.S. PATENT DOCUMENTS 4,274,550 A * 6/1981 Feldstein ........... B65D 83/0472 225/16
5,630,347 A * 5/1997 Elvio ...................... G07F 11/68 83/210
5,833,122 A * 11/1998 Reid ................... G07F 17/0078 221/26
6,941,948 B2 * 9/2005 Staniforth .......... A61K 31/4045 128/203.15
7,963,201 B2 * 6/2011 Willoughby ........ G07F 17/0092 83/210
8,989,896 B2 * 3/2015 Brown ............... B65D 83/0463 700/242
10,176,663 B2 * 1/2019 King ..................... A61J 7/0481
11,485,568 B2 * 11/2022 Tignanelli ............. A61J 7/0445
2013/0066463 A1 * 3/2013 Luoma ................... G16H 20/13 700/232
2013/0175286 A1 * 7/2013 Barrett ............... B65D 83/0463 221/25
2013/0299381 A9 * 11/2013 Luciano, Jr. .............. A61J 1/03 53/473
2016/0300773 A1 * 10/2016 Lee ..................... H01L 23/3121

(Continued)

*Primary Examiner* — Rakesh Kumar
(74) *Attorney, Agent, or Firm* — C. Tumey Law Group PLLC

(57) ABSTRACT

An apparatus, system, and method for improving the efficiency of medication distribution within a healthcare facility. In particular, the invention provides parallel dispensing of multiple medications from a network of modular, connected, and automated or semi-automated dispensing modules. The method is directed toward receiving and executing multiple collection, dispensing, and delivery orders simultaneously while operating in a healthcare facility. The invention may sort medications for storage and subsequent delivery while rapidly servicing a high volume of pharmacy orders. The invention includes visible, electronic marking of data which may indicate its stored medication and final destination. The system tracks each unit as it transports medication throughout the facility. The invention organizes the stored medication using removable packaging which allows identification and verification of dosage by the system while being easily accessed by staff.

9 Claims, 12 Drawing Sheets

(56) References Cited

U.S. PATENT DOCUMENTS

| | | | | |
|---|---|---|---|---|
| 2023/0274827 | A1* | 8/2023 | Wang | G16H 15/00 705/2 |
| 2023/0285247 | A1* | 9/2023 | Williamson | G07F 11/44 |
| 2023/0311312 | A1 | 10/2023 | Nie et al. | |
| 2023/0372203 | A1* | 11/2023 | Niitsuma | A61J 7/0084 |
| 2023/0401529 | A1* | 12/2023 | Wang | G06Q 30/0635 |
| 2023/0404855 | A1* | 12/2023 | Yamaya | A61J 7/0069 |
| 2024/0047034 | A1* | 2/2024 | Davey | G16H 20/10 |

* cited by examiner

1000

APPARATUS, SYSTEM, AND METHOD FOR AUTOMATED MEDICATION DISPENSING DEVICES

FIELD OF THE INVENTION

The present invention relates generally to automated robotic systems. Specifically, the present invention is a device designed to securely deliver medicine within a medical or pharmaceutical facility along with a system and method for coordinating a series of such devices.

BACKGROUND OF THE INVENTION

The process of dispensing and delivering medications within large healthcare facilities such as hospitals can be a complex and time-consuming process. Giving incorrect medications to a patient can hinder the patient's recovery or, worse, endanger their health. To avoid this, a number of safeguards are put in place to ensure accurate provision of these medicines. Unfortunately, these safeguards may inhibit the efficiency of medical facilities, particularly as the volume of patients scales upward.

In many hospitals, the central pharmacy distributes the dosages and quantity of medications a patient needs several times per day. This is generally done for each patient and nursing unit. Once the medication outlay has been determined for a period, a medication "pick list" is created where pharmacy staff will pick these medications from stock for dispensing to patients. This will often include repackaging and sorting of the medications. Without assistance from automation, these tasks are performed manually. These medications may be delivered directly to patients or stored in a designated cabinet for dispensing at the appropriate times, generally at the nursing station nearest to the patient.

These steps can produce a significant number of errors, due to the human aspect of manual picking tasks. Errors frequently originate from storing the medications at an incorrect location or picking medications from an incorrect location when dispensing to the patient. Further, due to the volume of medications handled by a pharmacy and the timing involved, they often fail to verify expiration date for a given dose at this stage in the process, resulting in some patients receiving expired medications. Other errors may occur due to mishandling and misidentifying one or more medications.

Some technological solutions have been introduced as a means to improve the accuracy and efficiency of the process. Automated dispensing robots are available to aid in the dispensing and intermediate storage of medications. Such robots can automatically acquire, verify, store, and distribute medications. These systems are, essentially, medication robots. One example of such a system is the Robot-RX® system, offered by McKesson Automation, Inc. as described in patent documents U.S. Pat. Nos. 5,468,110A, 5,593,267A, and 5,880,443A. Another example is the system described in U.S. Pat. No. 11,078,018B2. Other technologies used for such systems include U.S. Pat. No. 8,036,773B2, U.S. Pat. No. 7,748,628B2, and US20070265730A1. These systems function similarly to one another.

In particular, the described systems operate using a small number of robotic arms to store and retrieve medications. This inhibits their ability to efficiently service a large, concurrent volume of medication provisions. This aspect means the system provides a slower fulfillment process than desired. Additionally, articulated mechanical components are particularly susceptible to electro-mechanical failures.

Mechanical failures can completely arrest the fulfillment process until repaired. Further, if such an automated system fails then staff may not be able to quickly locate the medication for patients in a timely manner.

The present invention aims to address these shortcomings of manual processes and the existing automated systems. The invention provides an automated device that organizes, stores, and dispenses medications. The device includes a cart for mobility. The devices can be tracked within the hospital as the medications are delivered to their destinations. The system allows multiple robots to work in coordination with one another. In effect, thousands of medications may be distributed concurrently by the present invention, whereas the prior art would be significantly more limited due to reliance on the articulated robot movement. Additionally, the stored medication is able to be readily located and accessed should a unit become non-functional. These medications can be readily transferred between devices when there are technical issues with a given device. Because of this, the system may be utilized to issue a replacement unit for delivery and its modularity allows staff to quickly reissue any needed medicine from the troubled unit.

BRIEF SUMMARY OF THE INVENTION

Embodiments of the present invention provide a mechanism to conduct concurrent storage, dispensing, and organization for a plurality of medications packaged in strips of connected punches stored in a plurality of small medication dispensing modules which are attached to transport modules, forming a unit. A plurality of units are, collectively, borne by a transport cart. Each unit operates independently from other units to dispense medication while delivered to a plurality of locations and patients in a healthcare facility, such as a hospital or hospice.

Dispensing modules are assigned a particular medication and dosage. Dispensing modules may have their medication loaded and unloaded when assigned or reassigned. A number of dispensing modules may be configured to fulfill medication orders for a plurality of specific medications and patients. Medications may include a variety of different specific drugs, dosages, packaging shapes or styles, packaging sizes, and/or material forms. These forms could include capsules, liquids, lozenges, powders, etc. Dispensing modules may be equipped with a digital display that imparts information about the stored medication, such as its destination and other status information. Additionally, the dispensing module may include a scanning component, allowing it to efficiently store and access information about the medication being distributed, such as expiration dates or a manufacturer's recall of its contained medication.

Transport modules may be interchangeable, allowing them to be attached to a number of different dispensing modules and/or carry a number of different medications as needs change within a service period, exchanging any contained medications if necessary. Additionally, transport modules may be equipped with a digital display that imparts information about the distribution process and other status information.

An operator may override the automated dispensing process and manually dispense medications from a dispensing module when needed. This feature allows medications to continue being delivered where there are system or network failures. This is achieved by the operator directly interacting with the dispensing module's onboard computer.

An infrastructural software for the system can allow tracking of medications, carts, and modules throughout their routes. This enables a centralized collection of data that can be utilized for record-keeping and troubleshooting. This data can be used to provide scheduling information to staff for when medication is available, other timing concerns, and location data for delivery. Staff can interact with the dispensing modules to access the medications and have access to information about the whereabouts of one or more modules should they need to enact contingencies or plan alongside other tasks. Additionally, the software can update the destination, schedule, or other information of one or more units according to changing needs. It also allows for a deployed unit to be recalled outside of its original schedule, returning unused/unneeded medications and prepared for redeployment.

DETAIL DESCRIPTIONS OF THE INVENTION

All illustrations of the drawings are for the purpose of describing selected versions of the present invention and are not intended to limit the scope of the present invention.

For the purposes of this application, the term “medication pouch” (203) refers to a unit dose of medication such as one or more oral solids, liquids, or powders of a given strength, form, or type that has been sealed in a package. Likewise, the term “medication strip” (120) refers to a number of connected medication pouches (203) containing the same medication. Multiple medication strips (120) within the system may have the same medication, whether at the same dosage. The term “Destination” refers to the location where dispensed medications (203) are assigned to be delivered. A destination may be a patient, a nursing station, a medication cabinet, another pharmacy, or any related area in a facility. Facilities may cover a significant area and/or include multiple interconnected buildings. A list of destinations is a list of locations where each one of the dispensed medications (204) should be delivered and/or a list of patients each one the dispensed medications (204) should be delivered to. All storage media are presumed to be non-transitory storage media unless specifically described otherwise.

Figure 2:
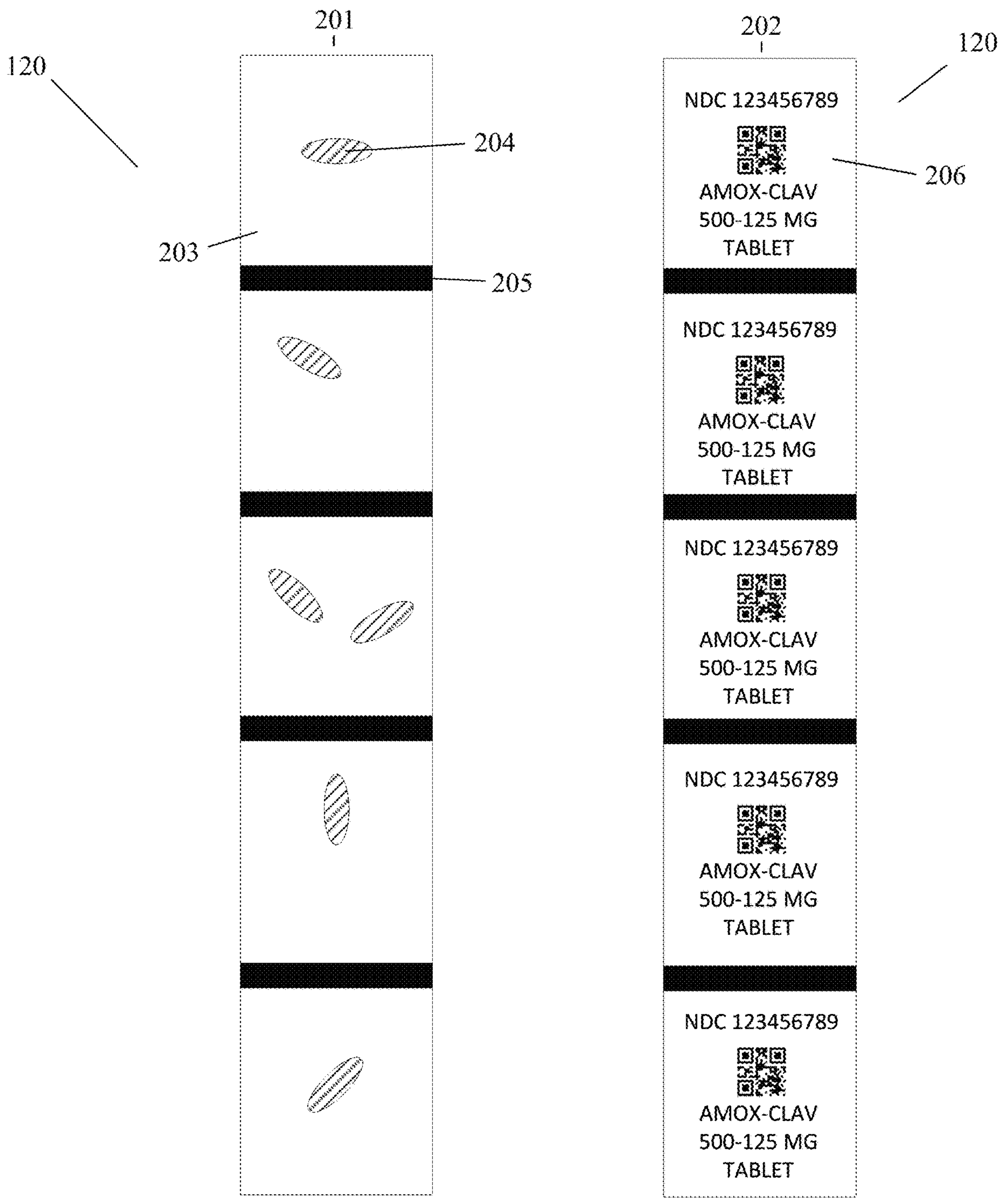
FIG. 2 is a diagram of a medication strip for an embodiment of the present invention.

FIG. 2 demonstrates a medication strip (120) for some embodiments of the invention. The strip (120) is displayed in two columns where the first column (201) indicates the top surface of the strip with a clear casing and the second column (202) indicates the bottom surface of the strip where opaque casing is used to convey data. The medications (204) are depicted as visible from the top side, each within an individual medication pouch (203) and separated by package separation marks (205). The opaque side indicates identifying information for the contained medication (206), such as an NDC number, QR Code, medication name, and dosage.

An embodiment of the automated medication dispensing apparatus comprises at least one dispensing modules (100), at least one transport modules (150), and at least one transport cart (800). A transport cart (800) may be a wheeled push cart, though other means of mobile transport may fall within the scope of this invention. The transport cart (800) is structured to carry at least one dispensing module (100) or at least one transport module (150).

Figure 7:
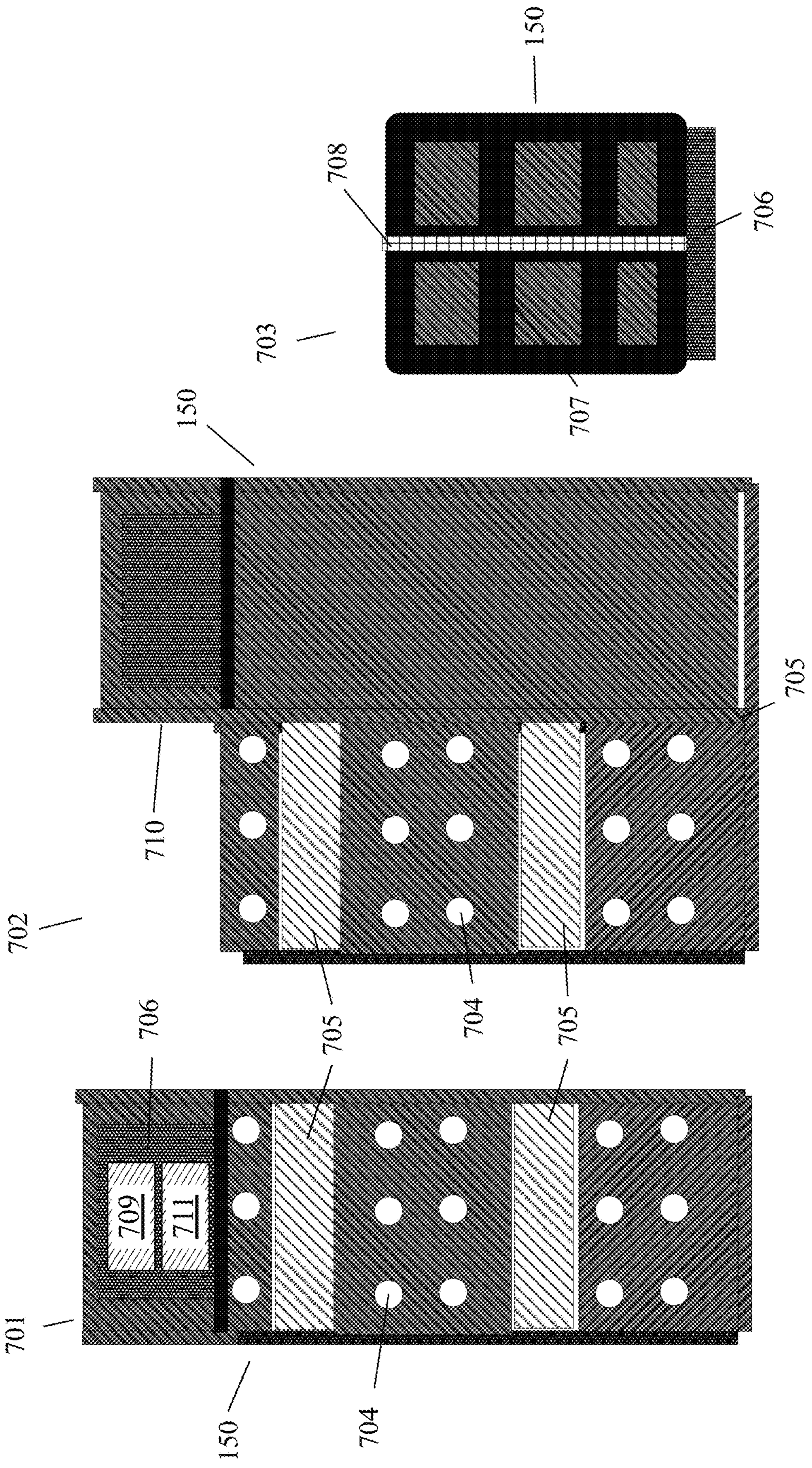
FIG. 7 is a set of diagrams demonstrating a transport module for an embodiment of the present invention.

FIG. 7 demonstrates an embodiment of a transport module (150) that serves as a temporary receptacle for dispensed medications (204, referring to FIG. 2). A transport module’s (150) structure comprises a cavity for holding dispensed medications (204), points for attachment to a dispensing module (100), and points for attachment to a transport cart (800). In some embodiments, the transport modules (150) will further comprise a microprocessing unit (706) and an electronic display (710). Microprocessing unit (706) in transport module (150) is distinct from microprocessing unit (111) in dispensing module (100). Microprocessing unit (706) may comprise a microprocessor (709) and a transmitter (711). In such embodiments, the transmitter (711) may be configured to communicate with the attached dispensing module (100) and transport cart (800) to display information about the dispensing of medications (204), such as availability for distribution by an operator and destination of the dispensed item(s). Other embodiments allow the transmitter (711) to be configured to communicate with other components of a related system, such as central software.

Figure 1:
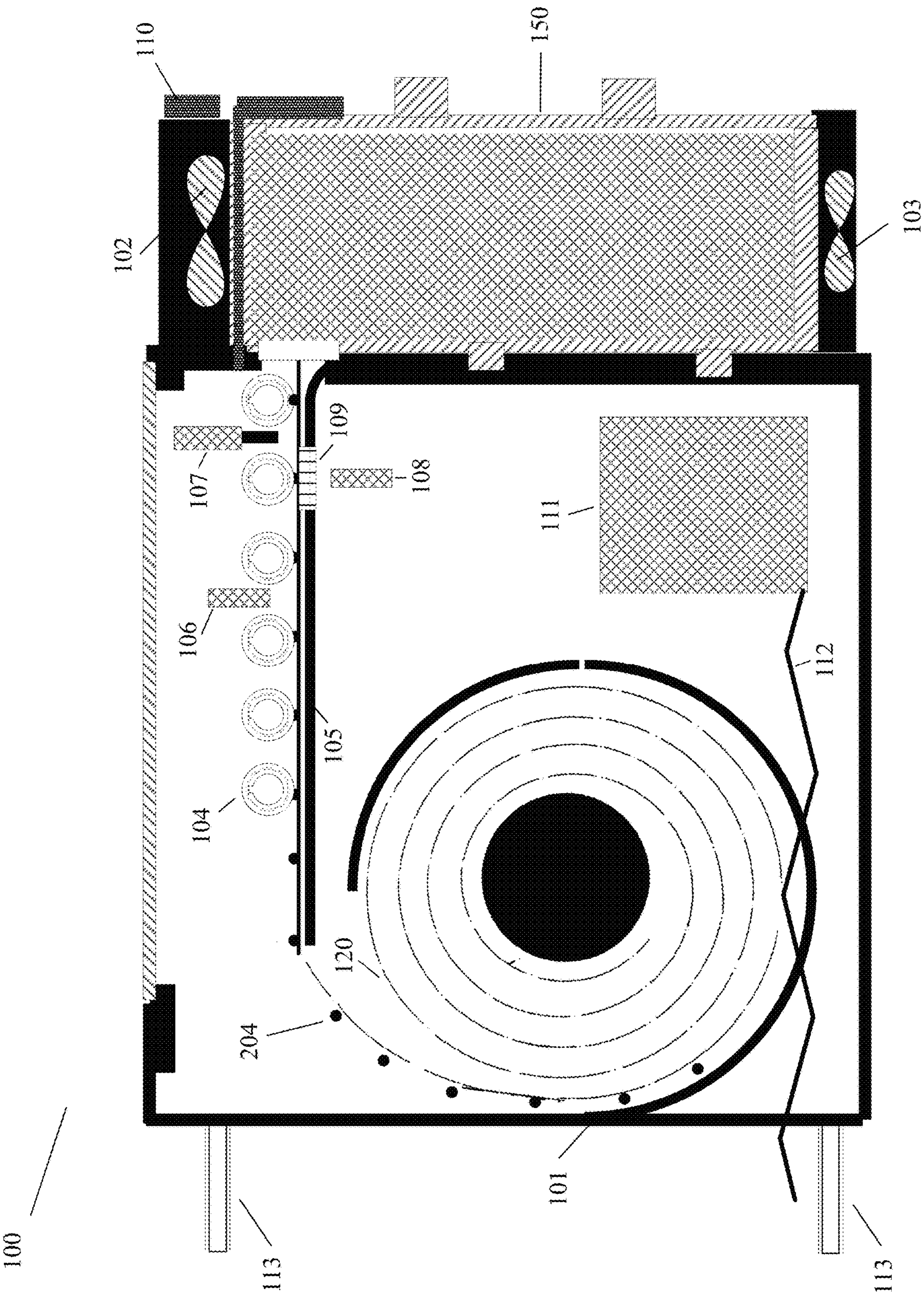
FIG. 1 is a diagram of a dispensing module for an embodiment of the present invention.
Figure 1B:
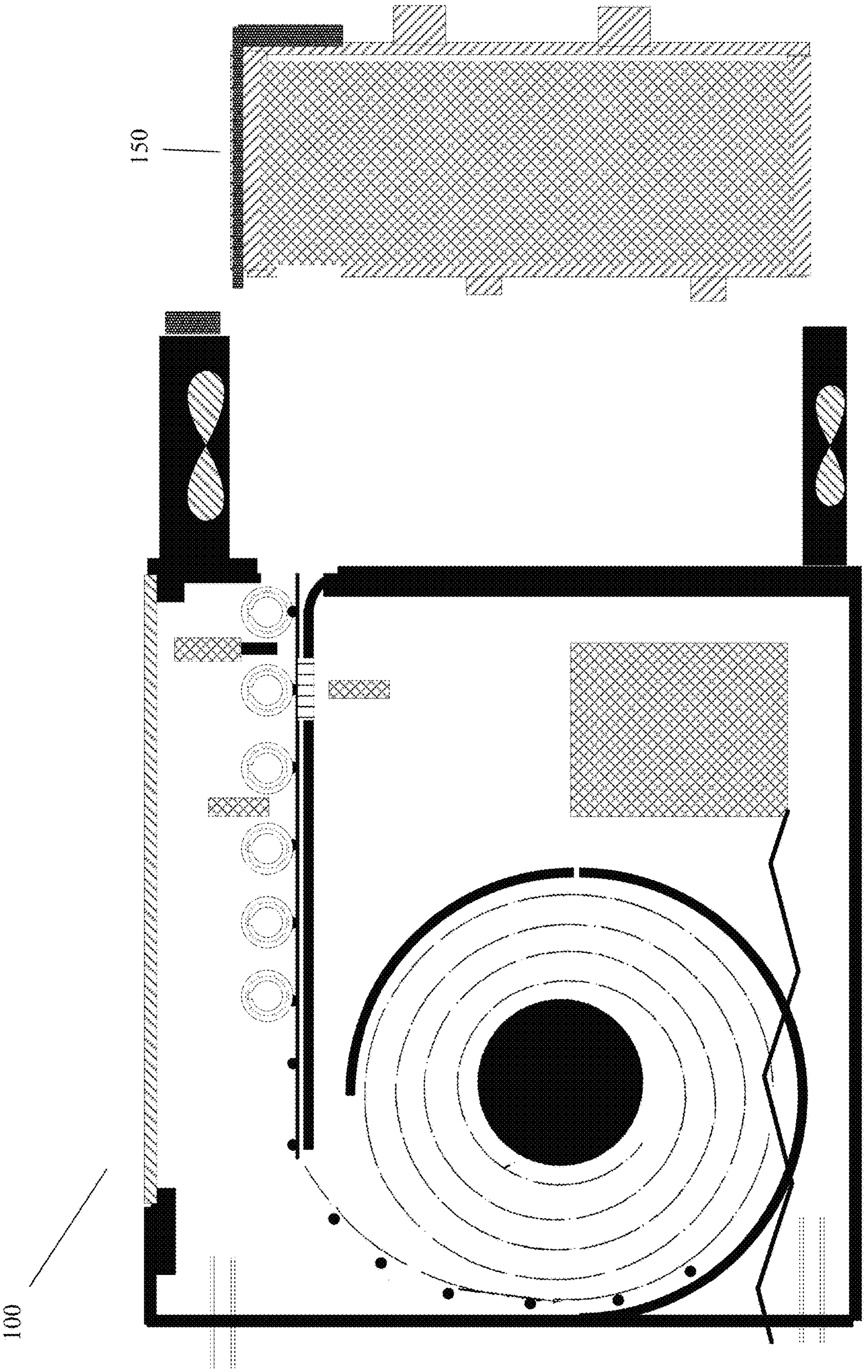
FIG. 1*b* is a diagram of a dispensing module for an embodiment of the present invention, wherein the dispensing module has been detached from the transport module.

FIGS. 1 and 1*b* demonstrate an embodiment of a dispensing module (100) on a side view. The module (100) comprises a drawer casing (101), a top fan (102), a bottom fan (103), an array of stepper or step motors (104), a guide bar (105), a first sensor (106), a cutter (107), a second sensor (108), a transparent opening (109), an electronic display (110), a microprocessing unit (111), and an electronic power and data connection (112). First sensor (106) and second sensor (108) may be visual sensors, for example. First sensor (106) may be located above guide bar (105) while second sensor (108) may be located below guide bar (105) as indicated in FIG. 1, for example. A rolled medication strip (120) is contained within a cavity of the dispensing module (100). For this embodiment, drawer shell casing (101) houses a medication strip (120) which unfurls as it distributes medication pouches (203, referring to FIG. 2) Comprising medications (204). The stepper motors (104) pull the medication strip (120) along the guide bar (105) and the cutter (107) removes each individual medication pouch (203) and drops it in the transport module (150) before it is distributed. The first sensor (106) and second sensor (108) identify what medication passes through the distribution pathway. The second sensor (108), specifically, views the distributed medication through the transparent opening (109) or window through the guide bar (105). These sensors (106, 108) may be configured to scan electronically relevant codes on the medication pouch (203), which the microprocessor (111) can transmit and/or store. The embodiment includes a panel to allow airflow through the top of the unit. Airflow is also facilitated by the top (102) and bottom fans (103) located adjacent to where the dispensing module (100) attaches to the transport module (150) to push medication pouch (203) down in the transport module (150). The microprocessing unit (111) also occupies the interior structure of the dispensing module (100). This microprocessing unit (111) comprises a microprocessor (115) and may further comprise a transmitter (116) and non-transitory storage media (117). For this embodiment, the contained electronics are connected to a power source and adjoining systems by its power and data connection (112). FIG. 1*b* provides a view where the dispensing module (100) has been detached from the transport module structure (150).

Dispensing modules (100) comprise a space to store a medication strip (120) and a means to distribute medication pouches (203) from that medication strip (120). The preferred embodiment further comprises first sensor (106) that enables microprocessor (115) to account for the quantity of medication pouches (203) dispensed through dispensing module (100). Some embodiments may enable dispensing modules (100) to independently remove medication pouches (203) from the strip though, otherwise, intact. Other embodiments may require medication pouches (203) to be removed from the strip by a staff member or other operator using the manual dispensing access point (406, referring to FIG. 4). Distribution may be aided in some embodiments by a conveyor belt or operations similar to how merchandise is retrieved from vending machines. Some embodiments may also comprise electronic display (110). Electronic display (110) from dispensing module (100) is distinct from electronic display (710) from transport module (150) to indicate information about the contents, destination, and/or schedule. Such electronics would be manually or automatically configurable to display the relevant information.

A microprocessor (111) of the apparatus will be configured to manage the computing functions of a given embodiment, such as navigation and propulsion. The preferred embodiment would enable the microprocessor (111) to communicate with an infrastructural management system through the one or more transmitters, enabling the apparatus to share pertinent data over a network. The preferred embodiment would further comprise electronic location hardware to indicate the position of the apparatus so that it can include that information in its reporting. Some embodiments may also comprise some quantity of non-transitory storage media (111) to record data. Such embodiments may log data in lieu of or in addition to transmitting that data over the network. Embodiments may also configure the apparatus to broadcast alert states across additional channels to aid in identifying and locating an apparatus that is unable to continue its transport or dispensing functionality. Embodiments would allow the management of the apparatus to be distributed over multiple microprocessors (111). An example embodiment would utilize a microprocessor (706) and electronic display (706) focused on the transport module (700) and a number of microprocessors (111) for the dispensing module (100), potentially up to one for each dispensing module (100). These microprocessors (706) & (111) would be configured to coordinate the tasks of the apparatus, rather than relying on a single microprocessor.

Figure 3:
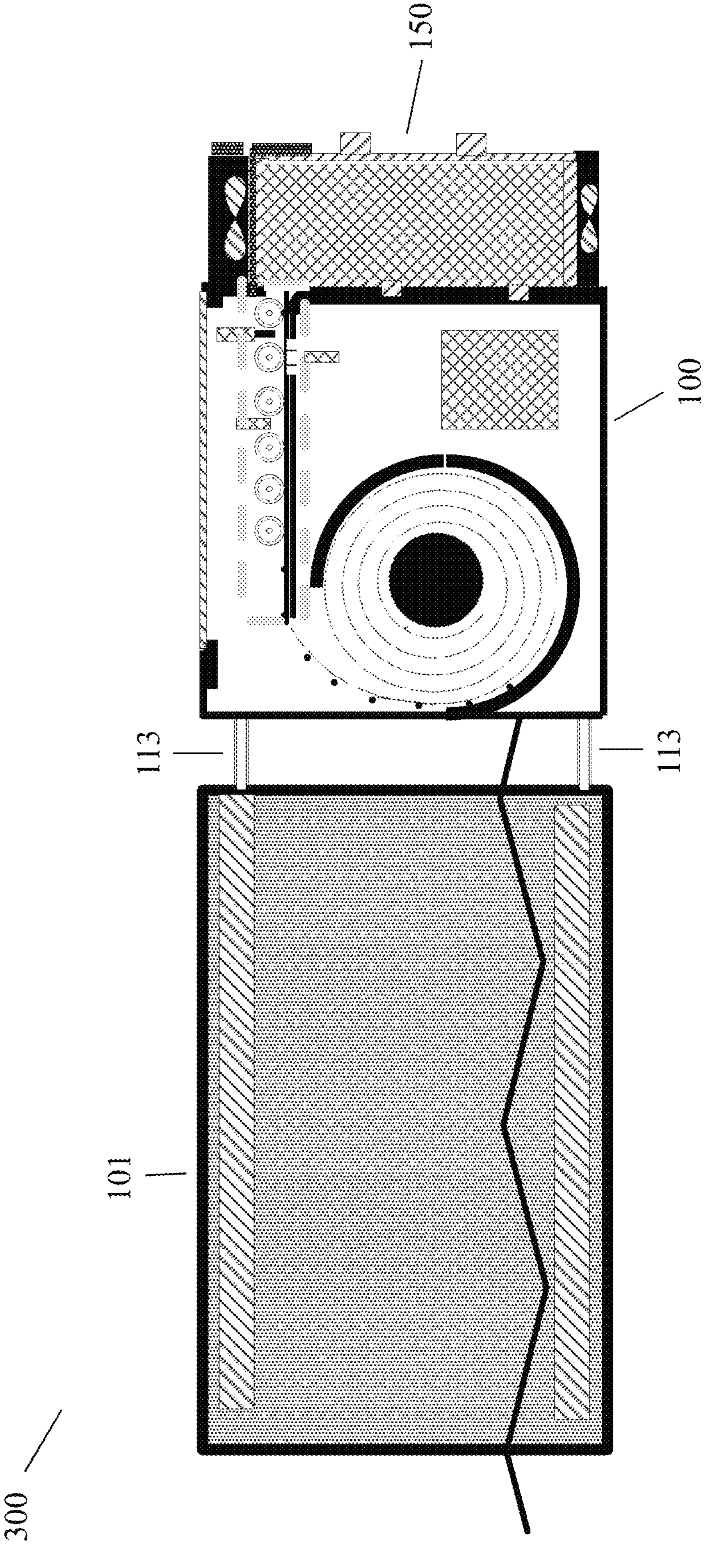
FIG. 3 is a diagram of a dispensing module for an embodiment of the present invention, wherein the inner drawer of the dispensing module has been pulled out of its outer casing.

FIG. 3 demonstrates a side view where an embodiment of the dispensing module with its casing (300) has its inner drawer (302) pulled out from inside its casing (301). This is achieved by utilizing a rail structure (113) to allow the inner drawer (100) to slide outward.

Figure 4:
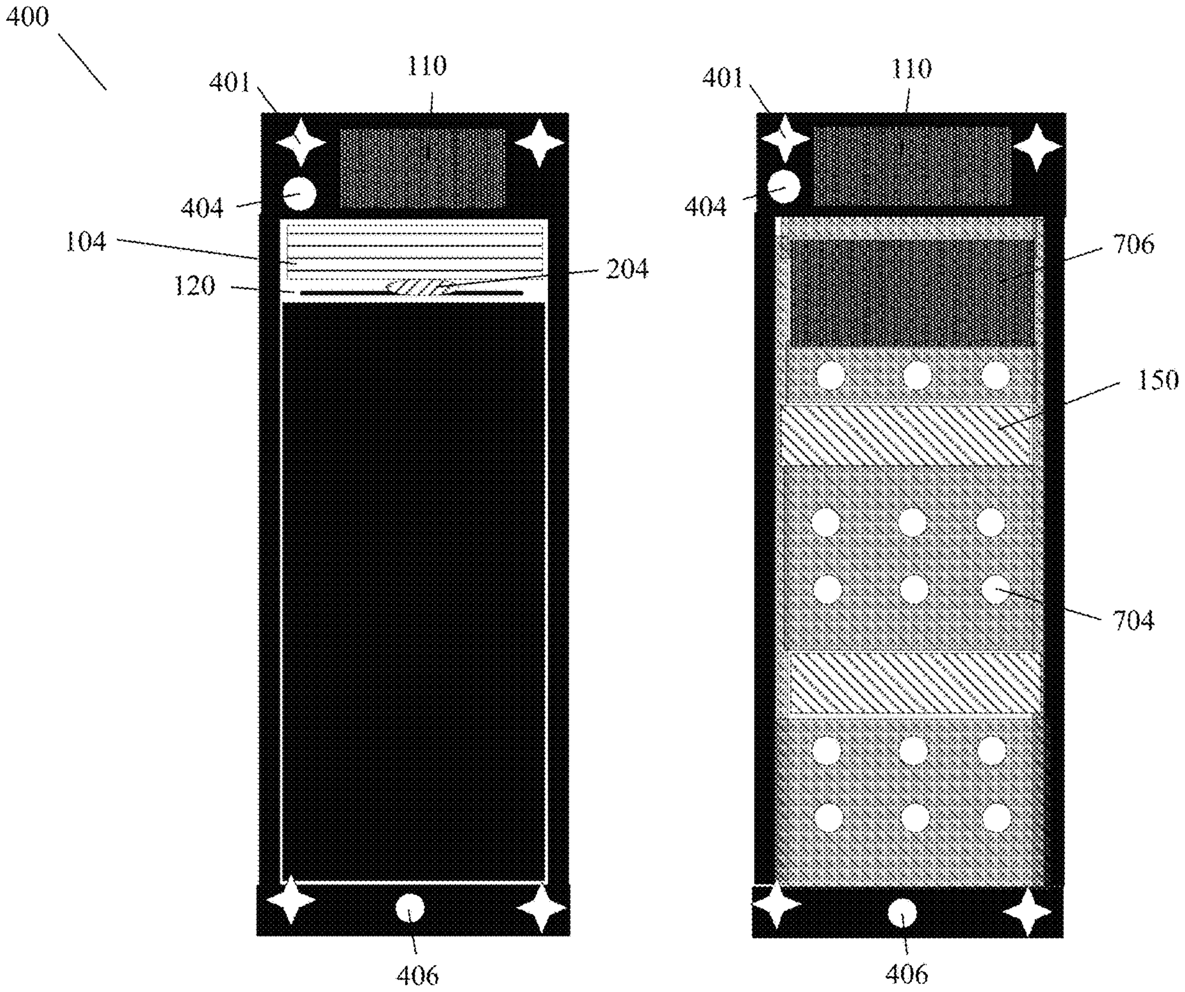
FIG. 4 is a pair of diagrams demonstrating the front of a dispensing module for an embodiment of the present invention, wherein the right view presents one with a transport module attached and the left one offers a presentation without an attached transport module.

FIG. 4 demonstrates two front views of an embodiment for dispensing modules (100). On each corner, a fastening point (401) designates where the transport module (150) may be attached to the dispensing module's casing (301). A digital display (110) is affixed to the face of the dispensing module's housing (100). An LED light (404) indicator is also present for this embodiment. Near the top of the dispensing module (4100), we see access to the roller mechanism (405) where the dispensing module (400) dispenses medication pouches (203) from the medication strip (120). Similarly, a manual dispensing access point (406) can be found toward the bottom of the module (4100). The left view (412) demonstrates a dispensing module (100) affixed to the transport module (150 & 409). A digital display (706) specific to the transport module (150) is near the display of the dispensing module (100). Improved airflow is facilitated through holes (411) in the dispensing module (100).

Figure 5:
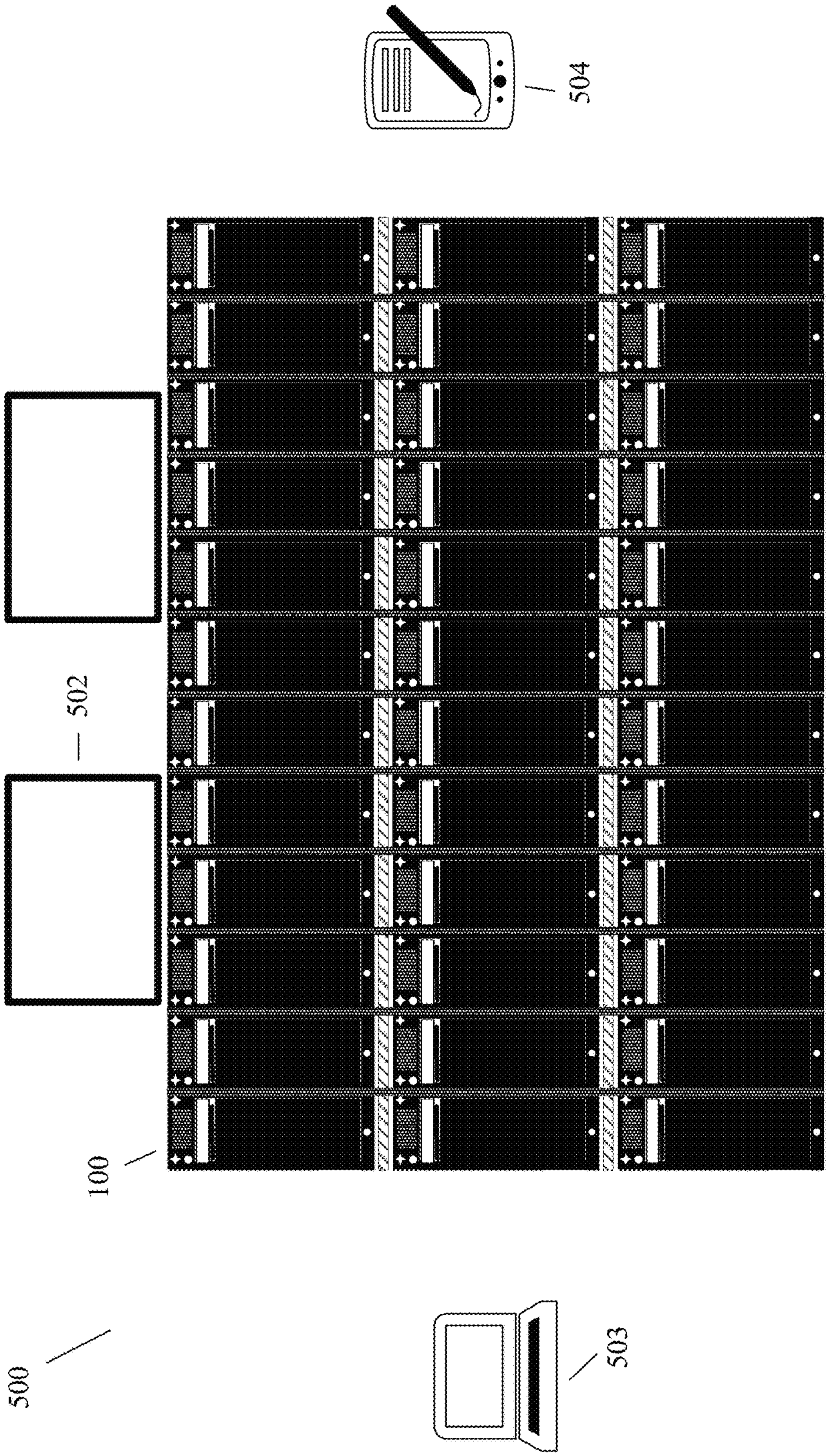
FIG. 5 is a diagram visualizing a coordinated system of dispensing modules for an embodiment of the present invention.

FIG. 5 is a visualization of the system (500) where multiple, individual dispensing modules (100) operate independently of each other and do not require the system to function. Such an embodiment may be conceived as a base where dispensing modules may be loaded and managed at the pharmacy. Alternately, the visualization may represent the dispensing modules (100) without regard to locality. This embodiment would include a number of electronic displays (502) where information can be presented for the system (500). The system may be accessed and managed through a fixed operator's device (5032) and/or mobile operator's devices (503 & 504).

Figure 6:
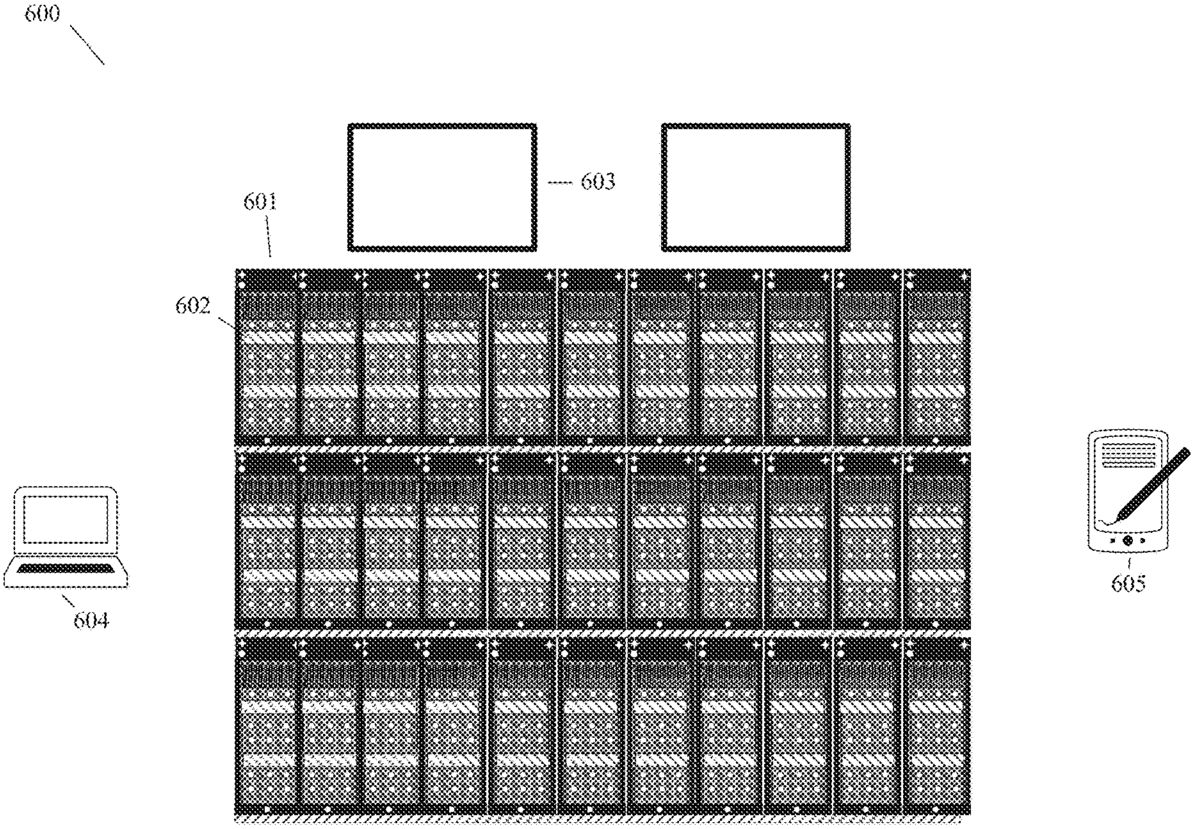
FIG. 6 is a diagram visualizing a coordinated system of dispensing modules for an embodiment of the present invention, wherein the dispensing modules are attached to a corresponding transport module.

Similarly, FIG. 6 demonstrates the system (600) where the array of dispensing modules (100) are each with a transport module (150). This embodiment may also comprise a number of electronic displays (503) where information can be presented for the system (600). For this figure, though shown collectively, the dispensing modules would be at multiple locations throughout the facility performing their delivery tasks. The system may be accessed and managed through a fixed operator's device (502) and/or mobile operator's device (503 & 504).

FIG. 7 demonstrates an embodiment of the transport module (150) in multiple states. The first of these states are front views of the transport module (150) in a closed state (701) and in an open state (702). Similarly, a top view of the transport module (703) is presented last. Airflow facilitating holes (704) are spaced across the module door. A locking mechanism (705) is affixed to the side of the door. On each view, we see an electronic display (706). On the top view (703) we see a handle (707) and wiring (708) extended from the microprocessor and display (706).

Figure 8:
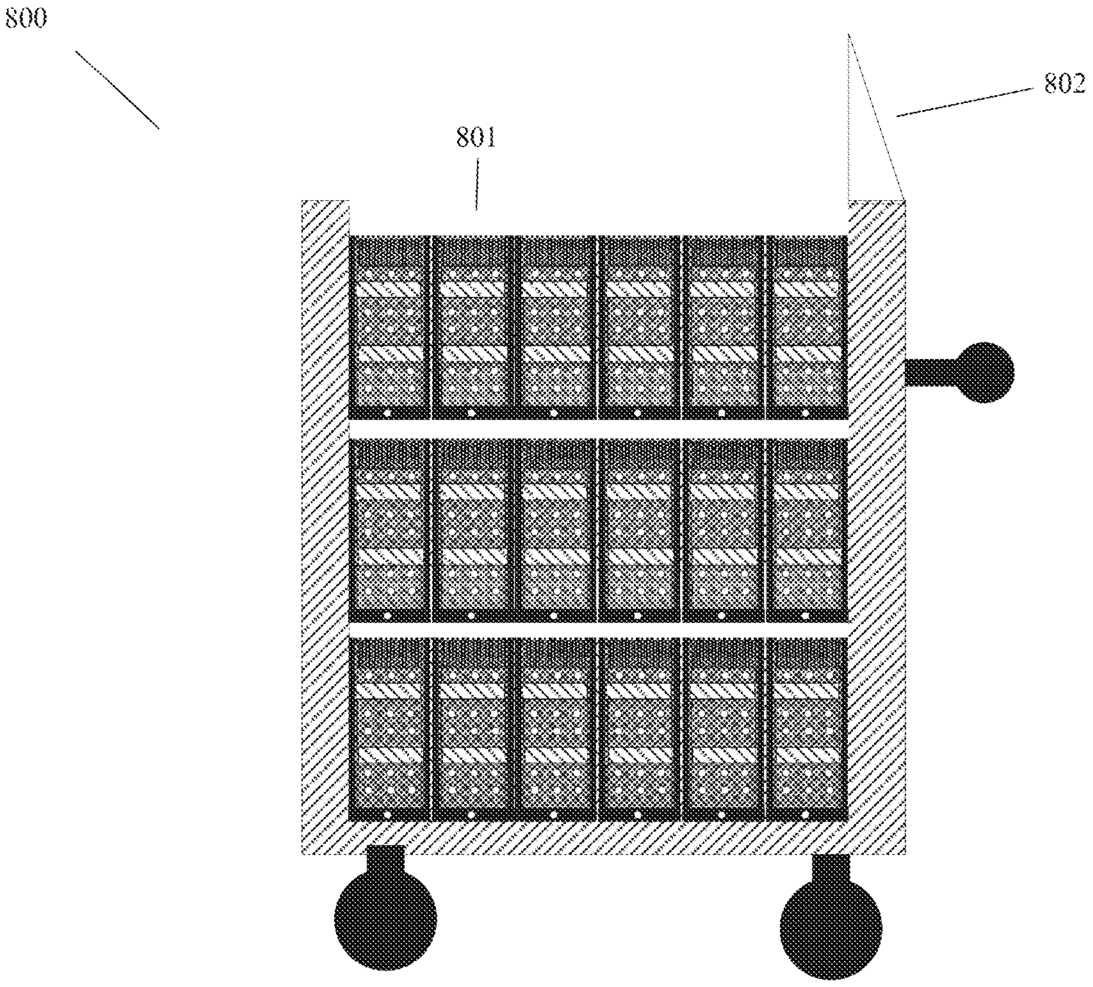
FIG. 8 is a diagram of a transport cart carrying the dispensing modules for an embodiment of the present invention.

FIG. 8 demonstrates the apparatus in the form of a transport cart (800). An array of transport modules (150) are affixed to the cart (800). The cart has its own microprocessing unit and screen (802) where the transport and individual dispensing module (100) information can be displayed collectively, in addition to individual displays on the dispensing modules (100).

Figure 9:
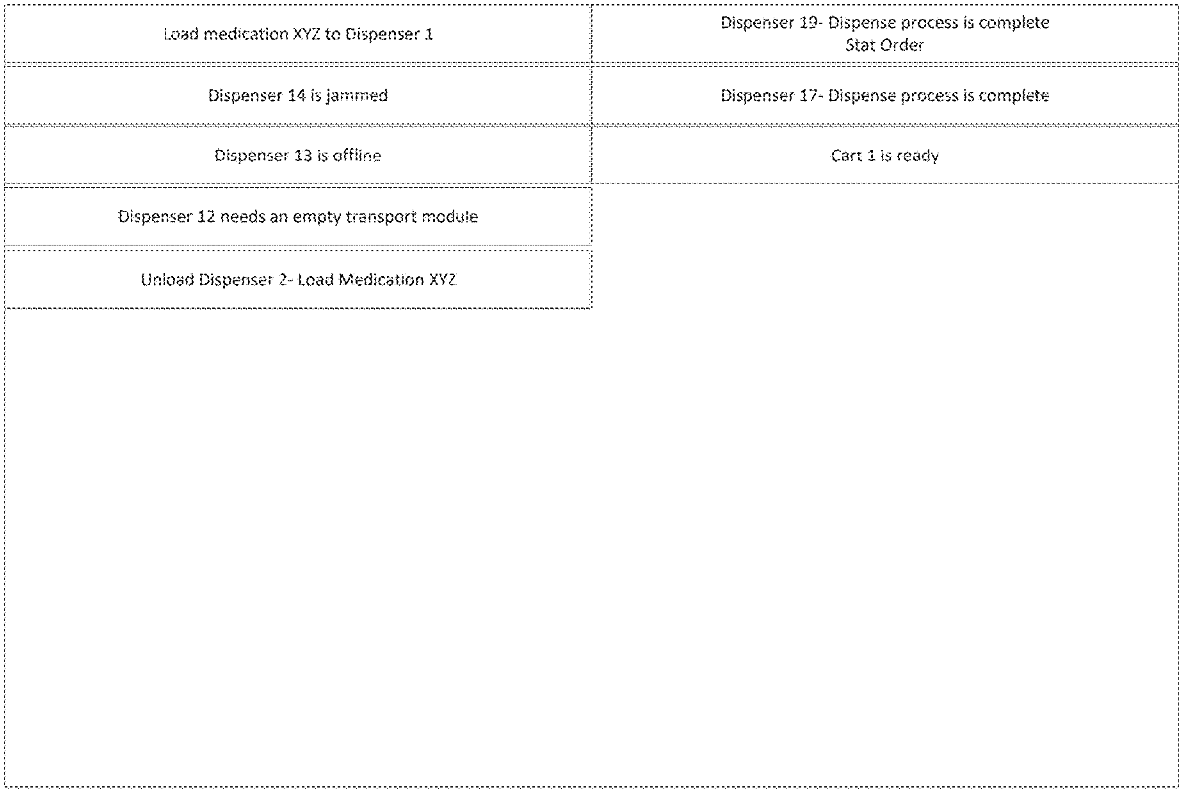
FIG. 9 is an example operator interface for an embodiment of the present invention.

FIG. 9 demonstrates an exemplary embodiment of the system's operator dashboards (user interfaces, 503-505).

This embodiment of the interface displays the status information for the deployed dispensing modules (150).

Figure 10:
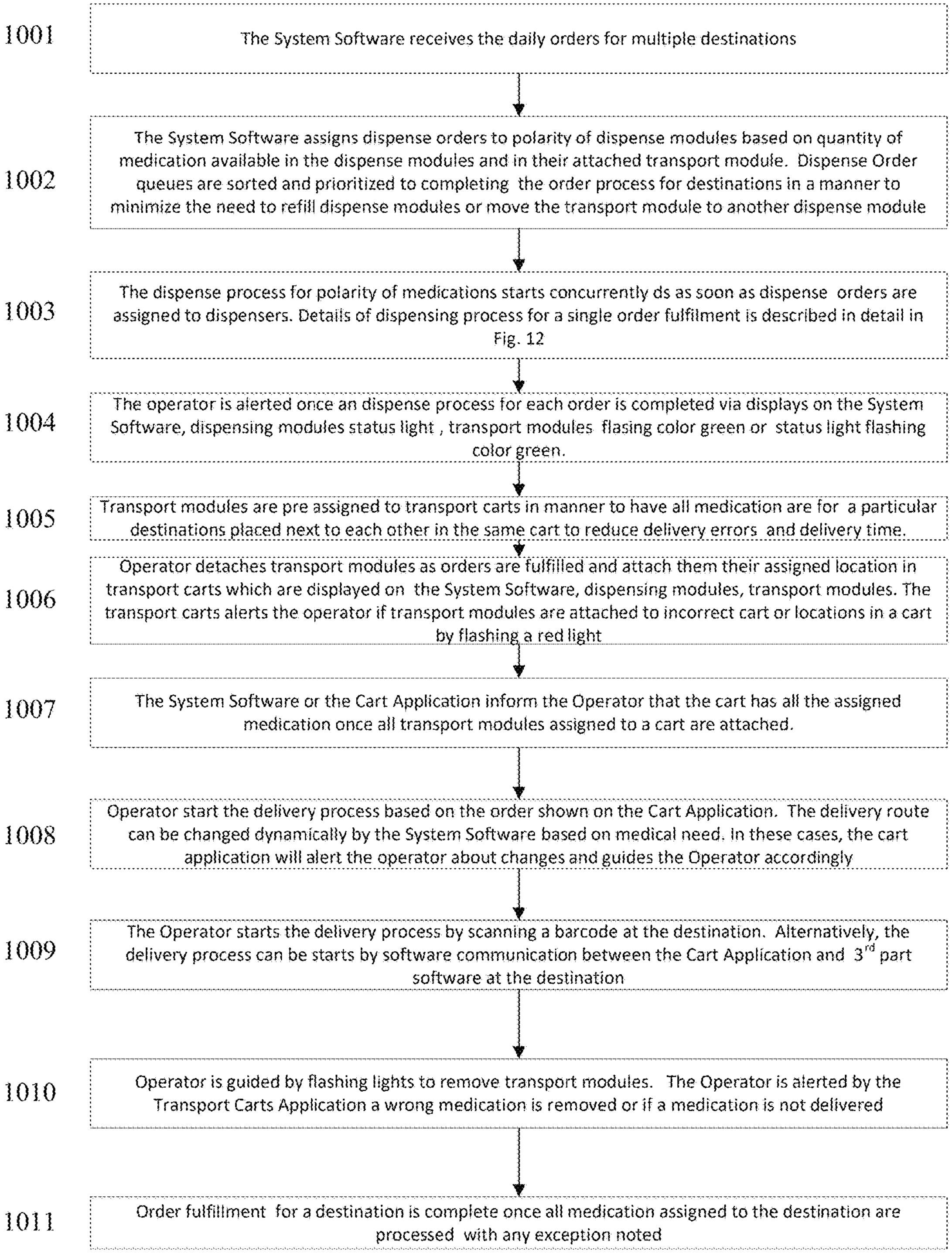
FIG. 10 is a flow diagram for the system work process in an embodiment of the present invention.

FIG. 10 is a flow diagram indicating an embodiment of the system work process for medication orders and delivery (1000).

Figure 11:
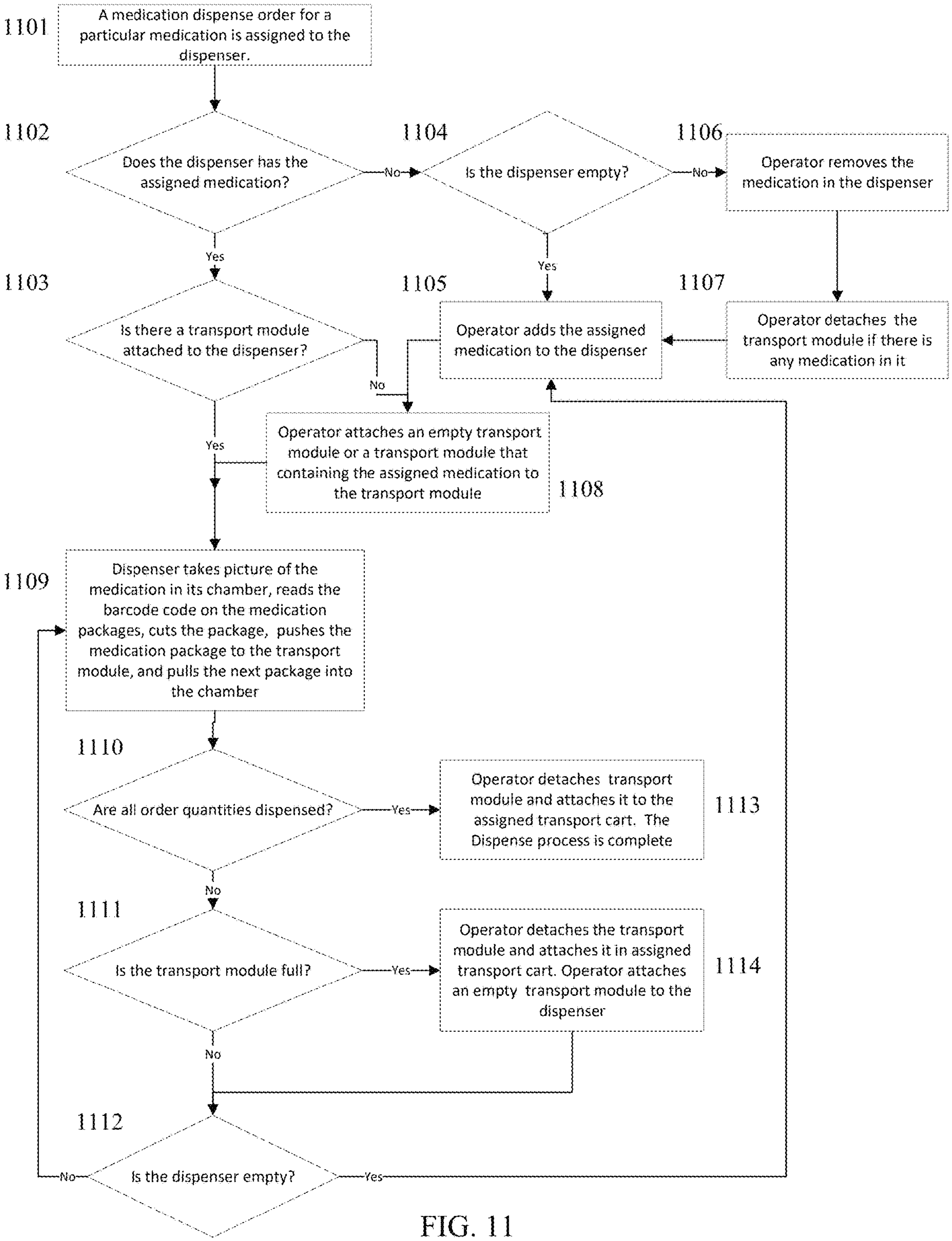
FIG. 11 is a logic diagram for the delivery process in an embodiment of the present invention.

FIG. 11 presents a logic flow diagram for individual dispensing modules within an embodiment of the system detailing functional workflow of how medications are stored in medications dispensers (100) and dispensed into transport modules (150) as needed (1100).

Although the invention has been explained in relation to its preferred embodiment, it is to be understood that many other possible modifications and variations can be made without departing from the spirit and scope of the invention.

What is claimed is:

1. An automated medication dispensing apparatus comprising:

a transport module,
a dispensing module, and
a transport cart;
wherein
the transport cart carries the transport module, the dispensing module, and one pair of attached transport and dispensing module;
the transport module comprising:
a sensor;
an electronic display, and
a microprocessor;
wherein
the transport module is removably attachable to the transport cart,
the transport module is removably attachable to the dispensing module,
the transport module is configured to hold a plurality of dispensed medication pouches,
the sensor is configured to indicate a presence of the dispensed medication pouches, and
the microprocessor is configured to receive status information from the sensor and indicates that information on the electronic display;
the dispensing module comprising:
a plurality of stepper motors,
a guide bar,
a cutter,
a microprocessor,
a sensor,
an electronic display,
non-transitory storage media, and
a dispensing module casing,
wherein
the dispensing module casing is removably attachable to the transport cart,
the dispensing module casing is removably attachable to the transport module,
the dispensing module casing holds a medication strip reel within its structure which is positioned to unfurl as medication is dispensed,
the cutter is positioned to sever a plurality of medication pouches from a held medication strip by pressing into the medication strip between medication pouches,
the plurality of stepper motors unfurl the held medication strip by pulling action along the guide bar,
the sensor records data from medication pouches as they are pulled, and
the microprocessor receives information of any held or dispensed medication from an operator and the sensor,
the microprocessor stores any received information on the non-transitory storage media, and
the microprocessor displays any received information on the electronic display.

2. The device of claim 1, wherein the dispensing module further comprise a transmitter and further wherein the microprocessor of the dispensing module communicates with a remote software system through the transmitter.

3. The device of claim 2, wherein the transport module further comprises a transmitter and further wherein the microprocessor of the transport module is configured to communicate with a remote software system through the transmitter.

4. The device of claim 3, further wherein the microprocessor of the dispensing module is configured to communicate with the microprocessor of an attached transport module and the microprocessor of the transport module is configured to communicate with the microprocessor of an attached dispensing module.

5. The device of claim 1, wherein the sensor of the dispensing module is configured to track a quantity for any stored medications as they are dispersed and to record these quantity changes to the module's non-transitory storage media.

6. The device of claim 1, wherein the sensor of the dispensing module includes at least one optical sensor capable of recording one or more images of any medication pouches that are dispensed from a contained medication strip.

7. The device of claim 6, further wherein the microprocessor executes software to verify the recorded medication pouch using images received from the sensor.

8. The device of claim 1, wherein the sensor of the dispensing module includes at least one visual sensor capable of scanning encoded identifying information of any medication pouches that are dispensed from a contained medication strip and software to process such scanning is loaded into the microprocessor.

9. An automation-assisted medication dispensing method with steps comprising:

Providing a list of medication orders comprising
a list of individual medications,
data corresponding to the individual medications, and
a list of destinations for each individual medication;
Providing a server comprising
a microprocessor,
a non-transitory storage media,
a logistics application,
an interface, and
a transmitter;
Providing of medication strip comprising interconnected medication pouches of medications corresponding to an individual medication from the list of medication orders;
Uploading the list of medication orders to the logistics application on the server;
Providing an automated medication dispensing device comprising a transport cart, a transport module, and a dispensing module;
Providing a medication cabinet to store the transport module and the dispensing module prior to installation on a transport cart;
Automatically scheduling a route for the automated medication dispensing device to transport the individual medications listed on the list of medication orders to their corresponding destinations through the logistics application;

Automatically assigning one dispensing module for the provided medication strips;

Automatically assigning to the automated medication dispensing device the dispensing module corresponding to the destinations and schedule determined by the logistics application for that device;

Attaching each assigned dispensing module to a transport module for their assigned device;

Sending the automated medication dispensing device on its route;

Delivering one or more medication pouches at each of the assigned destinations;

Returning the transport module and the dispensing module of the automated medication dispensing device to the medication cabinet; and Electronically recording a count of the delivered medication pouches.

* * * * *